United States Patent
Wolfgang et al.

(10) Patent No.: US 7,024,609 B2
(45) Date of Patent: Apr. 4, 2006

(54) SYSTEM FOR PROTECTING THE TRANSMISSION OF LIVE DATA STREAMS, AND UPON RECEPTION, FOR RECONSTRUCTING THE LIVE DATA STREAMS AND RECORDING THEM INTO FILES

(75) Inventors: H. Lewis Wolfgang, Stamford, CT (US); Weimin Fang, Stamford, CT (US)

(73) Assignee: Kencast, Inc., Stamford, CT (US)

( * ) Notice: Subject to any disclaimer, the term of this patent is extended or adjusted under 35 U.S.C. 154(b) by 578 days.

(21) Appl. No.: 10/126,119

(22) Filed: Apr. 19, 2002

(65) Prior Publication Data

US 2003/0009718 A1    Jan. 9, 2003

Related U.S. Application Data

(60) Provisional application No. 60/284,920, filed on Apr. 20, 2001.

(51) Int. Cl.
*H04L 1/16* (2006.01)
(52) U.S. Cl. ...................... 714/748; 709/219
(58) Field of Classification Search ............ 714/748, 714/749, 751; 709/219
See application file for complete search history.

(56) References Cited

U.S. PATENT DOCUMENTS

| | | | | |
|---|---|---|---|---|
| 4,718,066 A | | 1/1988 | Rogard | 714/751 |
| 4,907,277 A | | 3/1990 | Callens et al. | 704/202 |
| 5,485,474 A | | 1/1996 | Rabin | 714/762 |
| 5,594,490 A | * | 1/1997 | Dawson et al. | 725/67 |
| 5,600,663 A | | 2/1997 | Ayanoglu et al. | 714/774 |
| 5,617,541 A | * | 4/1997 | Albanese et al. | 709/207 |
| 5,631,907 A | | 5/1997 | Guarneri et al. | 370/474 |
| 5,768,533 A | * | 6/1998 | Ran | 709/247 |
| 5,790,524 A | | 8/1998 | Bennett et al. | 370/244 |
| 5,959,974 A | | 9/1999 | Badt et al. | 370/233 |
| 6,012,159 A | | 1/2000 | Fischer et al. | 714/744 |
| 6,031,818 A | * | 2/2000 | Lo et al. | 714/748 |
| 6,052,819 A | | 4/2000 | Barker et al. | 714/776 |
| 6,104,757 A | | 8/2000 | Rhee | 375/240 |
| 6,141,788 A | | 10/2000 | Rosenberg et al. | 714/774 |
| 6,151,696 A | * | 11/2000 | Miller et al. | 714/748 |
| 6,189,039 B1 | * | 2/2001 | Harvey et al. | 709/232 |
| 6,249,810 B1 | * | 6/2001 | Kiraly | 709/217 |

(Continued)

OTHER PUBLICATIONS

Miller, "Reliable Multicast Protocols: A Practical View", Local Computer Networks Conference Proceedings, Nov. 1997, pp. 369-378.*

(Continued)

*Primary Examiner*—Stephen M. Baker
(74) *Attorney, Agent, or Firm*—Fitzpatrick, Cella, Harper & Scinto

(57) ABSTRACT

The present invention relates to a system for (1) protecting the transmission of packet streams between a host computer and one or more client computers, and (2) upon reception, (a) reconstructing any outage damage caused during the transmission to the packet streams, and (b) digitally recording the reconstructed packet streams to a file. The present invention also relates to a method for dynamically generating a file index table as the packet stream is being digitally recorded.

4 Claims, 7 Drawing Sheets

DIGITAL RECORDING OF FEC PROTECTED STREAMS INTO FLAWLESS FILES

U.S. PATENT DOCUMENTS

| | | | |
|---|---|---|---|
| 6,445,717 B1 * | 9/2002 | Gibson et al. | 370/473 |
| 6,526,022 B1 * | 2/2003 | Chiu et al. | 370/229 |
| 6,567,929 B1 * | 5/2003 | Bhagavath et al. | 714/18 |
| 6,574,795 B1 * | 6/2003 | Carr | 725/71 |
| 6,594,798 B1 * | 7/2003 | Chou et al. | 714/820 |
| 6,671,807 B1 * | 12/2003 | Jaisimha et al. | 713/193 |
| 6,701,373 B1 * | 3/2004 | Sakazawa et al. | 709/232 |
| 6,735,634 B1 * | 5/2004 | Geagan et al. | 709/235 |
| 6,765,889 B1 * | 7/2004 | Ludwig | 370/331 |
| 6,782,490 B1 * | 8/2004 | Maxemchuk et al. | 714/18 |
| 6,804,244 B1 * | 10/2004 | Anandakumar et al. | 370/395.21 |

OTHER PUBLICATIONS

Michael O. Rabin, "Probabilistic Algorithms in Finite Fields," SIAM J. Comput. vol. 9, No. 2, May 1980 pp. 273-280.

Michael O Rabin, "Efficient Dispersal of Information for Security, Load Balancing, and Fault Tolerance," Journal of the Assoc. For Computing Machinery vol. 36, No. 2 Apr. 1998 pp 335-348.

R.J. McElience and D.V. Sarwate, "On Sharing Secrets and Reed-Solomon Codes," Communications of the ACM, Sep. 1981 vol. 24.

Adi Shamir, "How to Share a Secret," Communications of the ACM, Nov. 1979, vol. 22, No. 11 pp. 612-613.

C.A. Asmuth and G.R. Blakley, "Proceedings of the 1982 Symposium on Security and Privacy," IEEE Computer Society, Apr. 25-26, 1982 Oakland CA, pp. 156-169.

Ehud D. Karnin, et al. "On Secret Sharing Systems," IEEE Transactions on Information Theory, vol. IT-29, No. 1, Jan. 1983.

* cited by examiner

FIG. 4 DIGITAL RECORDING OF FEC PROTECTED STREAMS INTO FLAWLESS FILES

FIG. 6 DIGITAL RECORDING OF PROTECTED STREAMS INTO FLAWLESS FILES

SYSTEM FOR PROTECTING THE TRANSMISSION OF LIVE DATA STREAMS, AND UPON RECEPTION, FOR RECONSTRUCTING THE LIVE DATA STREAMS AND RECORDING THEM INTO FILES

CROSS-REFERENCE TO RELATED APPLICATIONS

This application claims the benefit of U.S. Provisional Application No. 60/284,920, filed Apr. 20, 2001, and incorporates the same in its entirety.

BACKGROUND OF THE INVENTION

1. Field of the Invention

The present invention relates to a system for (1) protecting the transmission of (live data) packet streams between a host computer and one or more client computers, and (2) upon reception, (a) reconstructing any outage damage caused during the transmission to the packet streams, and (b) digitally recording the reconstructed packet streams to a file. The present invention also relates to a method for dynamically generating a file index table as the packet stream is being digitally recorded.

2. Description of Related Art

U.S. Pat. No. 6,012,159, which is incorporated herein by reference, discloses a forward error correction (FEC) encoding method for reliably transferring packets of data between a transmitter and receiver in a computer network or communication system. In particular, that patent provides various packet-level FEC encoding techniques to ensure that large, multimedia data files, including digitized music, still images or moving images, such as may be transmitted by a host computer to one or more receiver subscriber computers using one-way satellite broadcasting, are received error free despite the effects of various types of noise interfering with the transmitted signal.

In many computer networks or communication systems, including the aforementioned one-way satellite broadcast system, the data bits or symbols (such as octets or bytes) are organized into larger groups called packets. When a file is transmitted, uncoded header packets preceding the information-containing packets are sent. Those header packets contain the address and control information to ensure that the following information packets are received by the addressed subscriber computers. Moreover, each packet itself includes uncoded header bytes that indicate, inter alia, to which file the packet belongs and the position of the packet within that file. The remaining bytes of the packet are the body which includes the informational data, such as compressed video data. For example, a packet may be 4,096 bytes long, wherein the header portion is the first 16 bytes, and the body portion is the remaining 4,080 bytes. A large digital object is thus transmitted as a sequence of "original" or "source" packets.

In the techniques described in U.S. Pat. No. 6,012,159, an extra number of error correcting "wildcard" packets are encoded and transmitted with the original packets to provide a predetermined level of protection against packet loss. For example, if a file contains 180 original packets, an extra 20 wildcard packets may be encoded and transmitted with those 180 original packets, as shown in FIG. 1A, to protect against a loss of any 20 packets (a 10% loss of the total transmitted). For the reasons described in that patent, the addressed subscriber computers can successfully reconstruct the large digital object from the received packets so long as any 180 packets, of the 200 packets transmitted, are successfully received.

Additionally, as also described in U.S. Pat. No. 6,012,159, a large file may be broken into smaller "chunks" or "shares", each of which generally contains the same number of packets, to allow the large file to be more easily transmitted and received by the system. Each share is individually encoded, transmitted, received and reconstructed (decoded). The file is made whole from the individually constructed shares. As also discussed in that patent, the packets of the shares may be interleaved to provide additionally protection against the effects of interfering noise. For example, a data file of 360 original packets and 40 wildcard packets may be divided into two shares of 200 interleaved packets each, as shown in FIG. 1B. Of course, as the files become larger, the number of shares will increase.

As disclosed in U.S. Pat. No. 6,012,159, packet-level error detection processing in the receiving subscriber computers provides an indication that a received packet is "good" or "bad". Also, an indication is made if a packet has not been received at all, i.e., "lost". The bad packets are marked as lost and are not used in further decoding. As further explained therein, as long as the number of lost packets does not exceed the number of wildcard packets, the original packets of the file or share may be completely and correctly reconstructed. Continuing the above examples, for each file or share, at least 180 packets of the 200 transmitted packets must be received as "good" packets for the successful reconstruction of the original 180 packets. The techniques for decoding the received good packets to reconstruct the original packets are described more fully in U.S. Pat. No. 6,012,159.

In U.S. Pat. No. 6,272,658, which is also incorporated by reference, the above-described file-oriented packet-level encoding and decoding techniques of U.S. Pat. No. 6,012,159 are extended from data files to data "streams". In the computer network/communication system arts, a stream may be a continuous sequence of octets (or bytes) without a packet structure, as in the phrase "TCP (transmission control protocol) is a stream-based protocol". On the other hand, a stream may be a continuous sequence of packets. For example, when those skilled in the art use the phrase "video (or audio) streaming", they are usually referring to a stream of UDP/IP (user datagram protocol/internet protocol) or IP Multicast packets. For the present application, a stream is generally any data arriving over a period of time which must be processed and transmitted as it arrives, without waiting for the data to end. Usually, the data is generated by an independent source, and at any given point in time the transmitting system has no knowledge of if or when future data will arrive.

In U.S. Pat. No. 6,272,658, data streams are assembled into "virtual files" of packets, and then the file-oriented encoding and decoding techniques of U.S. Pat. No. 6,012,159 are applied thereto. That is, the host computer collects the data of the streams into packets, and the packets are collected into a virtual file. The virtual file is then encoded by the host computer using the techniques of U.S. Pat. No. 6,012,159, and the encoded packets are transmitted to the subscriber computers. At the subscriber computer side, the packets are received and collected into a virtual file, which is then decoded using the techniques of U.S. Pat. No. 6,012,159. Once the virtual file is decoded, it is output by the subscriber as a stream of packets, or as a stream of unpacketized data if applicable. However, the method described in U.S. Pat. No. 6,272,658 has a drawback in that delays are created when the host computer waits for data to arrive from the source so it can be packetized and made into a virtual file. Another delay is created as the subscriber computer waits for the arrival of all of the packets required to reconstruct the virtual file. Further, a great deal of memory, and associated read/write operations, is required for storing the virtual file.

To remove these delays from the "virtual file" method of encoding data streams of U.S. Pat. No. 6,272,658 and to reduce the memory requirements thereof, in U.S. patent application Ser. No. 09/544,161 (which is also incorporated by reference) a method is provided in which the packet-level encoding and decoding techniques of U.S. Pat. No. 6,012,159 are applied directly to data streams without the creation of virtual files. In the method of U.S. patent application Ser. No. 09/544,161, when a packet of data arrives from a source, or a packet is formed from arriving source data bits or octets, the packet's error-correcting contribution to a group of wildcard packets is computed. Once that computation is done, the packet can then be transmitted to the subscriber computer without waiting for the arrival of any other source packet, thus making the encoding process nearly instantaneous. In particular, advantage is taken of the identity submatrix of the encoding generator matrix described in U.S. Pat. No. 6,012,159, which causes the encoded source packets to be identical to the original source packets. Thus no actual encoding of the source packets is required, and the source packets may be transmitted as soon as the computation of its wildcard contributions has been completed. The contributions from the source packets to each wildcard packet of the group are summed, and when all of the contributions have been computed for all of the wildcard packets associated with the group of source packets, the wildcard packets are transmitted. At the receiver, the source packets may be reconstructed from the-received packets using the packet-level decoding techniques set forth in U.S. Pat. No. 6,012,159.

Also in the method of U.S. patent application Ser. No. 09/544,161, if a timeout occurs at the host computer because no further stream data is forthcoming, or a signal is received from the source indicating that the data stream has ended, an appropriate set of wildcard packets is transmitted, thus preventing the data stream information from becoming stale. Optionally, the number of wildcard packets sent, as compared to the total number of wildcard packets normally computed for the group, may be proportional to the number of source packets actually received by the host computer, as compared to the number of source packets normally received by the host computer when no timeout occurs.

As the use of live data streams increases, for example, on the Internet, the need to protect those streams upon transmission with minimal delay and bandwidth, so as to permit perfect reconstruction and recording of the same upon reception, becomes even greater.

SUMMARY OF THE INVENTION

The system of the present invention may include a host computer and/or one or more client computers. The host computer captures a (live data) packet stream, and encodes it "on-the-fly" using the forward error correction ("FEC") techniques described in the U.S. Pat. Nos. 6,012,159 and 6,272,658, and U.S. patent application Ser. No. 09/544,161. This FEC-encoded stream is then transmitted, for example, by satellite or via the Internet, to one or more client computers. Upon reception, a client computer reconstructs the packet stream to correct for any outage damage (missing packets), again using the techniques of U.S. Pat. Nos. 6,012,159 and 6,272,658, and U.S. patent application Ser. No. 09/544,161. The reconstructed packet stream may then be played back, through standard browsers, by the appropriate playback engine, or rebroadcast as it is reconstructed. In addition, the packet stream may be digitally recorded to a file. Those files may be subsequently played back or rebroadcast.

In addition, after a packet stream is initially captured to a local file, if the reconstruction is not perfect, the receiver can interact with the host computer through a back channel to repair any remaining defects in the local file by retrieving missing (lost) packets, and return a certification that the file is flawless and ready for rebroadcast.

In addition, as a packet stream is being recorded into the file, it may also be dynamically indexed.

BRIEF DESCRIPTION OF THE DRAWINGS

The various aspects of the present invention can be best understood by reference to the detailed description of the preferred embodiments set forth below taken with the drawings, in which.

DETAILED DESCRIPTION OF THE PREFERRED EMBODIMENTS

The following is a description of the systems and methods of the present invention as shown in accompanying FIGS. 2–7.

Delivery of Outage Protected Streams and Initial Digital Recording

In preparation for the broadcast of live streams with packet-level FEC protection, a system administrator at the host computer 100 specifies the following parameters:

a. The moving window of the live stream, specified in seconds, to be analyzed—for example, a moving 12 seconds of live streaming content.

b. The amount of FEC protection, specified in percent of live content within the moving window, to add within the moving window—for example, 25% or 3 seconds out of the 12 seconds. The size of the moving window and the amount of protection have no inherent limit.

Files or live streams may first be input to commercially available encoders (streaming servers) 50 (for example, Microsoft Media Server, Cisco's IP/TV, RealNetworks Real Audio or Real Video, LiveCaster, etc.). The commercially available encoders 50 generate proprietary live streams in IP multicast format as IP packets embedded into ethernet packets (via Internet 60). This is a media-encoded live (packet) stream. The present invention also works on packet streams that have not been media-encoded—that is, it does not matter what type of encoding is performed on the data, if any, prior to packetization.

Figure 1A:
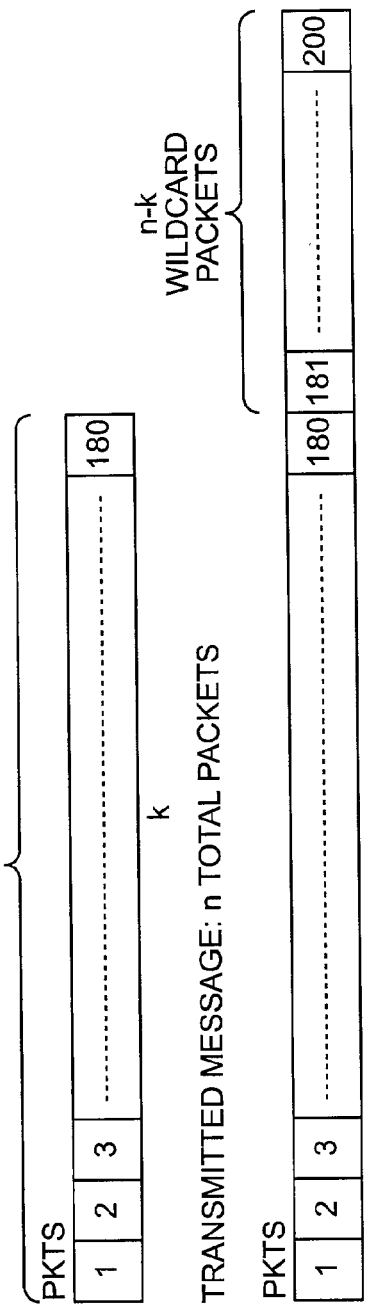
FIG. 1A depicts an example of a file of packets including original packets and wildcard packets.
Figure 1B:
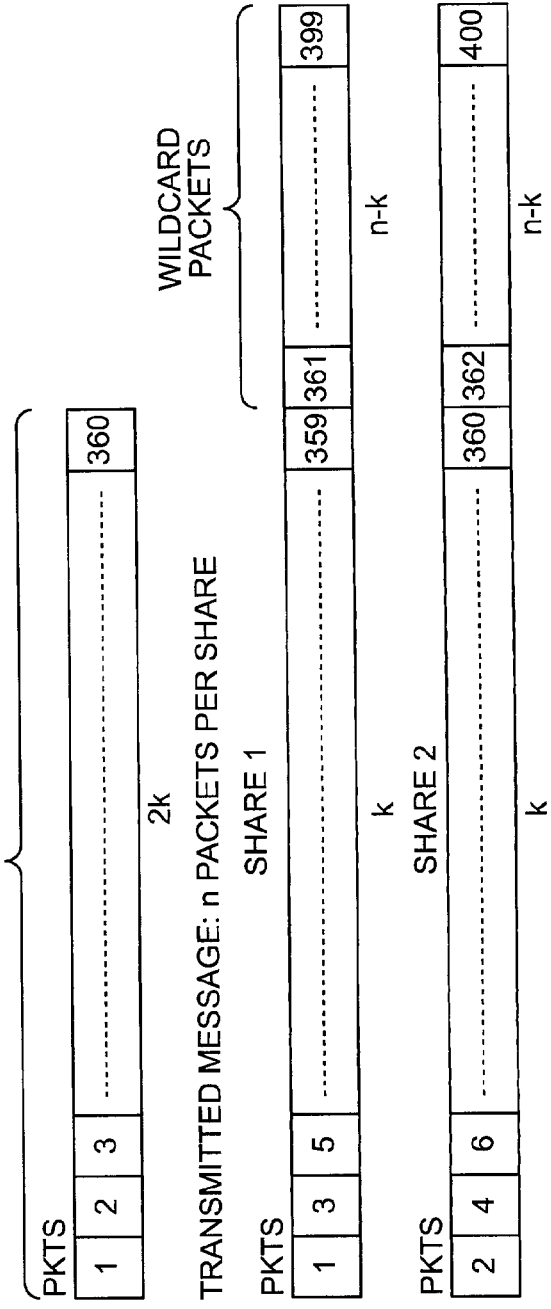
FIG. 1B depicts an example of a file with shares of interleaved packets.
Figure 2:
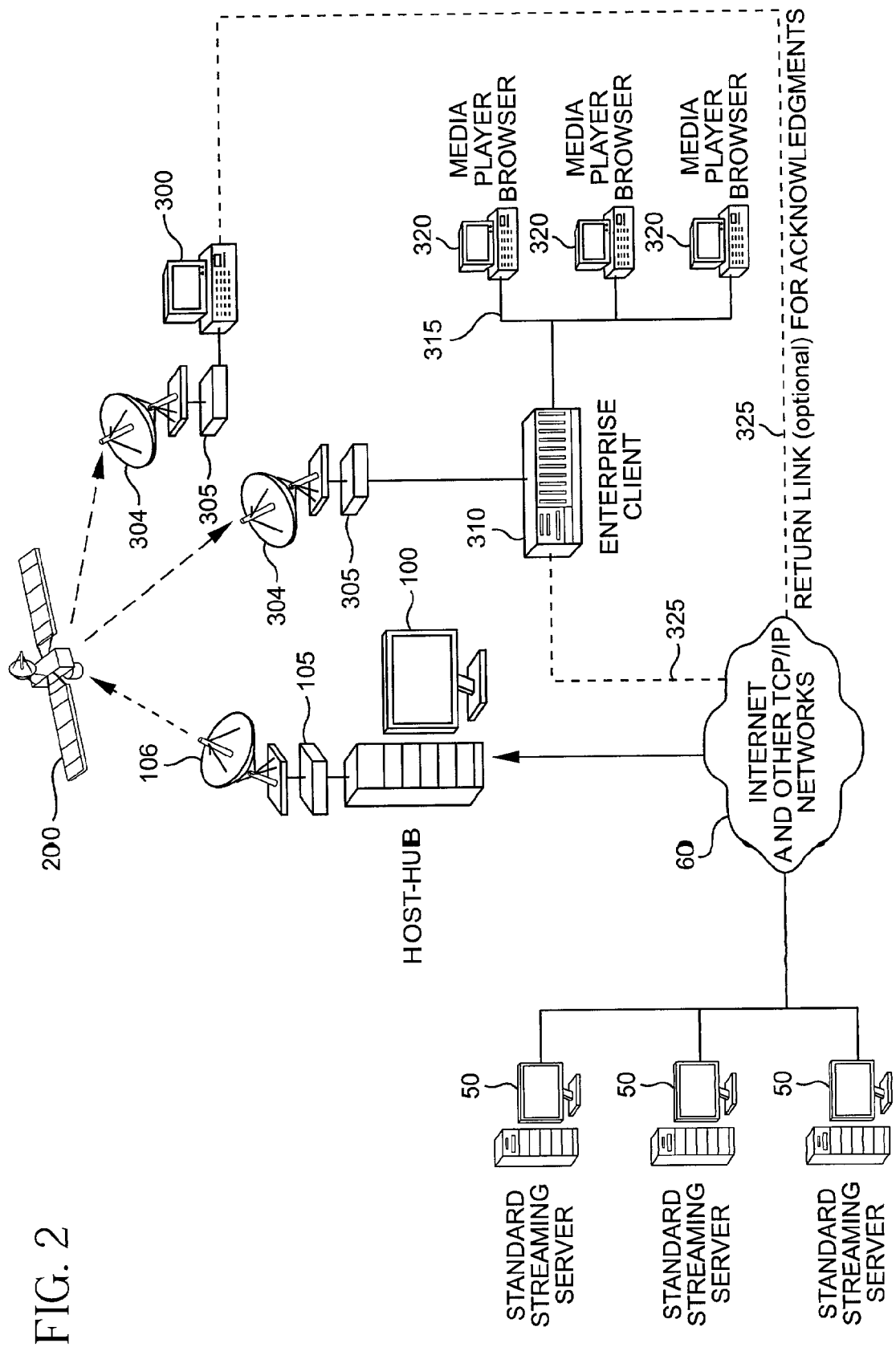
FIG. 2 depicts the system of the present invention.
Figure 3:
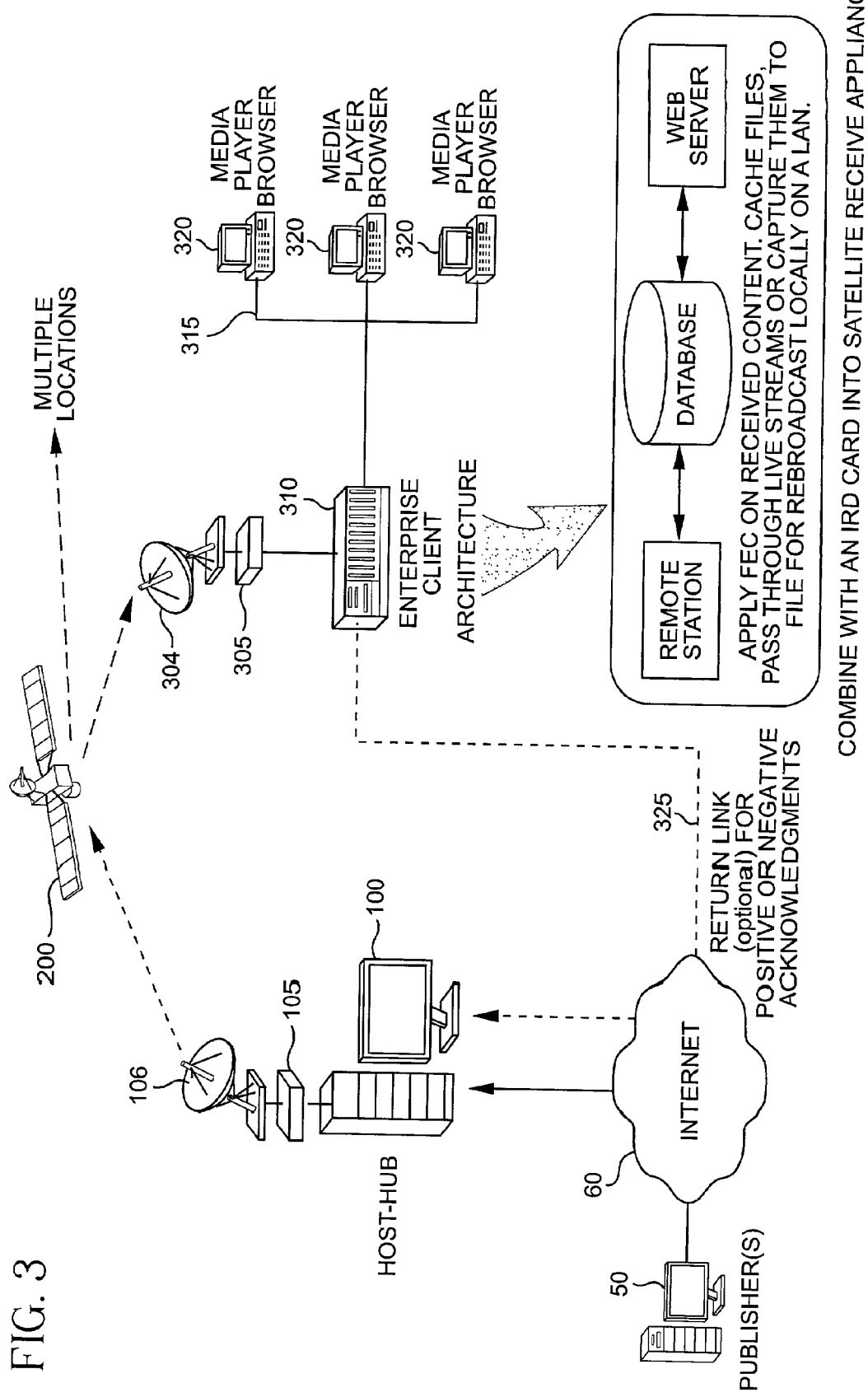
FIG. 3 depicts the enterprise client of the present invention.
Figure 4:
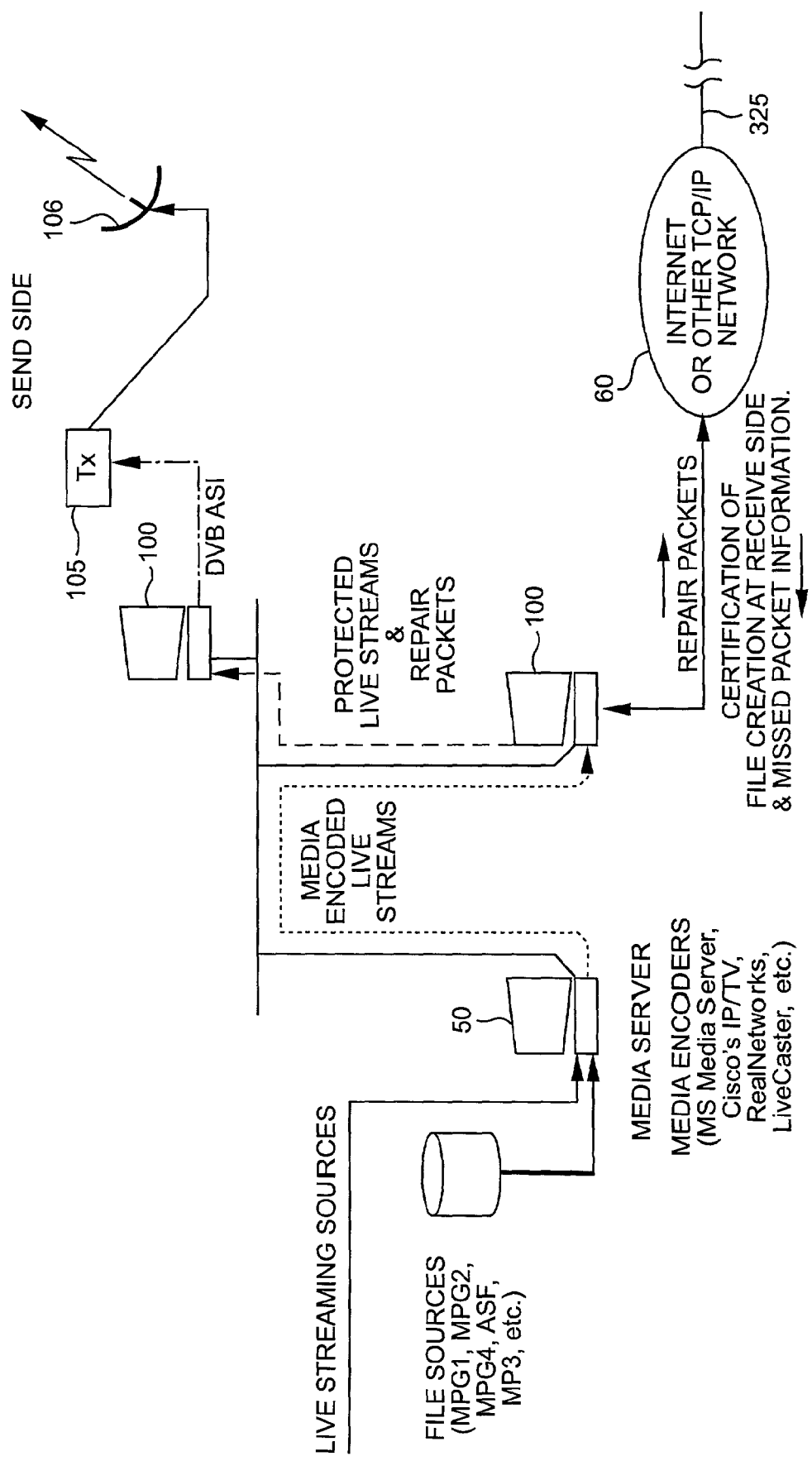
FIG. 4 depicts the send side of the system of the present invention.
Figure 5:
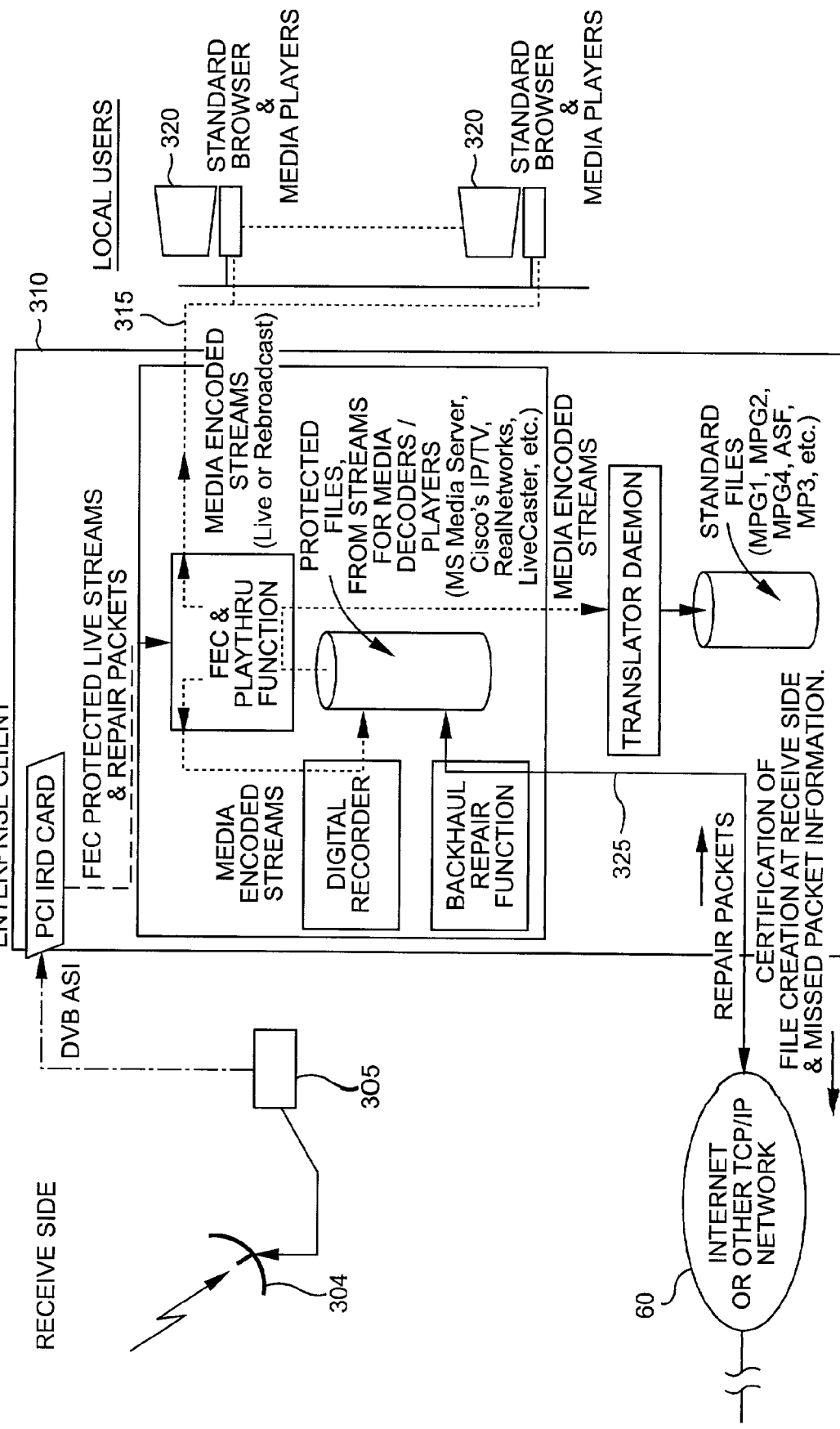
FIG. 5 shows the receive side of the system of the present invention in the case of an enterprise client.
Figure 6:
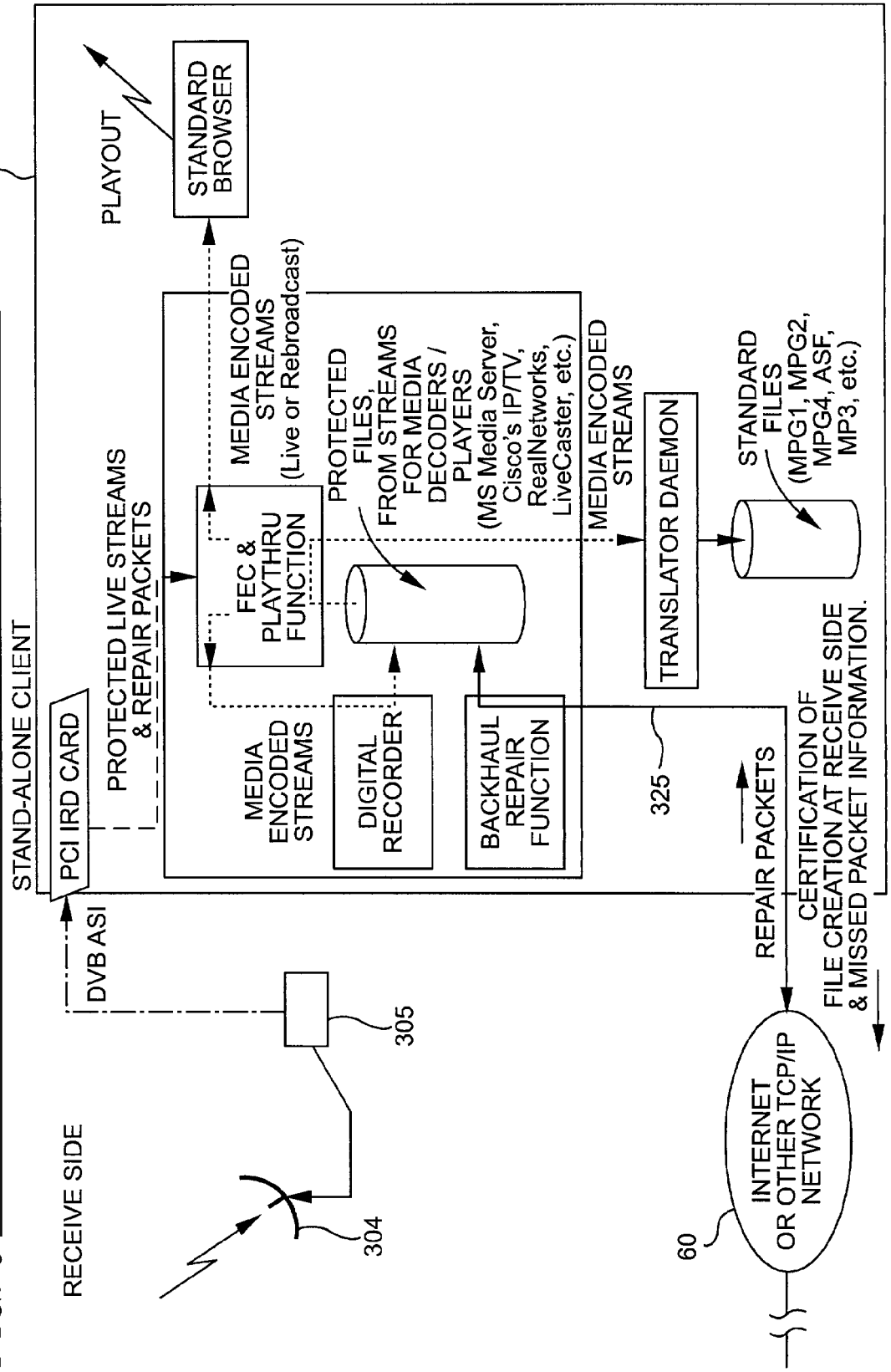
FIG. 6 shows the receive side of the system of the present invention in the case of a standalone client.

Referring to FIGS. 2–4, the host computer 100 captures the live streams of ethernet packets with the embedded IP multicast packets (via Internet 60), and encodes the live streams. That is, without buffering, FEC "wildcard" packets are added to the stream on the fly, using the techniques described in the U.S. Pat. Nos. 6,012,159 and 6,272,658 and U.S. patent application Ser. No. 09/544,161. This results in an FEC-encoded (protected) live stream of packets. The output from the host computer 100 will have more ethernet packets, equal to the amount of added FEC wildcard packets.

The host computer 100 also saves the complete stream packets (as received in media encoded live stream format from the host computer 100) into a file. This file may encompass the live stream from start to finish, or is may represent a file captured from the input stream over a period of time. This file will be used in the subsequent process of creating flawless files at the receive side.

The stream is fed into the IP multicast broadcast network—satellite 200 or terrestrial network such as fiber optic (not shown)—and transmitted to one or more receive sites by transmitter 105 via antenna 106. This can be in a variety of formats, but typically when satellite it is in DVB ASI protocol. The receive site can be either a standalone client computer 300 or an enterprise client 310. There is generally no difference in the functionality of the enterprise client 310 (FIGS. 2, 3 and 5) and the standalone client 300 (FIGS. 2 and 6)—the enterprise client 310 additionally permits the distribution of the live streams, or the rebroadcast thereof, to a number of local users 320, for example, via a LAN 315.

At the receive site the stream is received by a network receiver 305 via an antenna 304 that outputs an ethernet stream identical to the one output from the host computer 100. This stream is captured by the client computer 300 or 310 and the following functions are performed:

A moving window of content, as specified by the system administrator, is captured at initiation of the reception.

When the buffer is full, or a timeout has occurred with respect to the arrival of new packets, the FEC decoder begins the process of identifying any missed packets, and reconstructs them from the received packets to the extent permitted under the choice of FEC percentage. Thereafter the buffer is continually replenished and the reconstruction process continues as long as the live stream continues.

The live stream on the designated IP address is then played through, resulting in an output of the original media-encoded live stream. Whether this is a standalone client computer 300 or an enterprise client computer 310, it is only necessary for the user to tune the browser of his choice to the designated address to play out the live stream. It is possible also to automatically tune the end user's browser to the correct IP address.

Simultaneously, under local direction or under directions from the host computer 100, a digital recorder will begin capturing the live stream (now in media encoded live stream format) to a file. Alternatively, the live data stream may be digitally recorded into a file without being simultaneously played back, or played back without being simultaneously recorded. This digital recording process will continue to the point specified, either locally or from the host computer 100, for termination. The result is a file in, for example, media-encoded live stream format, that can be rebroadcast by the system under direction of a graphical user interface provided within the system and played through a standard browser. The rebroadcast can be directed to a browser on the standalone client computer 300, or by the enterprise client computer 310 to a local network of users 320 with the appropriate browser. Further, rebroadcasting may be done as the packets are reconstructed, without the packets first being recorded.

Creation of Flawless Files Locally for Live Rebroadcast

The packet-level FEC applied to the incoming live streams allows for the successful recovery, on the fly, from most outages (missing packets) caused during transmission. When the outage exceeds the parameters of the moving window and the percentage of protection, however, the resulting file as initially captured by the digital recorder will still have outages due to missing packets.

The following steps are followed to complete the creation of a flawless file.

Using a backhaul function via a back channel 325, the client computer 300 or 310 will call the host computer 100 or be called by the host computer 100. This connection can be established over any available TCP/IP network 60, such as the Internet.

Outage information (the missed packet information) is then sent from the client's computer 300 or 310 to the host computer 100.

The host computer 100 can use packets at the host computer 100 that were captured into the file created during reception of the media-encoded live stream and FEC wildcard packets created against this file to complete the creation of the local files. The process of creating repair packets will use the most efficient combination of original packets and FEC wildcard packets.

In this regard, the method of U.S. patent application Ser. No. 09/314,121 (also incorporated herein by reference), directed to minimizing the number of data packets required for retransmission on a two-way (forward- and back-channel) communication system, may be used to reduce the total number of retransmitted packets required for transmission from the host computer 100 to the one or more client computers 300 or 310.

When the necessary repair packets are assembled to satisfy all local client computers 300 or 310 that have submitted missed packet information, the host computer 100 will broadcast the repair information. This can be done:

a. On the IP multicast network (for example, via the satellite 200) as a broadcast, or b. On the TCP/IP network 60 as a point to point transmission.

The repair packets when received by the client computer 300 or 310 will be used to complete a flawless file.

Upon initial completion of the file by the digital recorder and after each subsequent attempt to make the file flawless, the results will be sent by the backhaul function through the back channel 325 to the host computer 100. This process will continue until a validation and certification that the file is flawless has been received from each client computer 300 or 310.

The method of U.S. Pat. No. 6,336,200 (also incorporated herein by reference), directed to validating communicated packets during the reconstruction process, and for locating erroneous packets so that they may be removed from the reconstruction process, may be used in the system of the present invention for validating both the reconstruction of the live stream data and, if applicable, recorded files.

At each client computer 300 or 310, the resulting file will be a flawless file in media-encoded live stream format. The rebroadcast function, with its own graphical user interface, can be used to rebroadcast this file as a live stream and play this live stream through the intended media player.

Alternatively, the live data streams do not need to be packet-level FEC encoded prior to transmission. Upon reception, the live streams will be captured into a file, possibly with missing packets. The client computer 300 or 310 can then use a back channel 325 to communicate with the host computer 100 to obtain the missing packets to repair the file.

Recreation of Standard Video and Music Files

It is also possible to convert the file captured by the digital recorder as specific media-encoded files, to standard video and music files (such as, MPG1, MPG2, MPG4, ASF, MP3, etc.). Files captured by the digital recorder, and subsequently certified as flawless files, can be sent to a commercially available daemon that performs conversion of streams in the formats of the major media servers to standard file formats.

Indexing

As stated above, the client computer 300 or 310 can capture a protected packet stream, reconstruct the packet stream into a live data stream, and record the reconstructed live data stream into a file. The client computer 300 or 310 can also index the reconstructed live data stream as it is being recorded into the file.

Indexing is the procedure of putting markers into a file for subsequent playback. Indexes are used to indicate advance through a playback file and to jump forward or backward to specific points in the video or song. It is typical to put indexes at a string of points throughout a file that is to be played back.

The use of indexes is visible to the user in the sliding bar that is typically found at the bottom of the screen in media players. As the video or song is played a small box moves along the sliding bar indicating how far into the file the playback has progressed. The small box is actually using the string of indexes throughout the file to identify the point to which the stream has progressed.

The indexing scheme in most protocols is unique and specific to the individual protocols. For example, indexing for MPEG2 streams employs an indexing scheme which is specific to MPEG2 only. MP3 streams will use a different indexing scheme and cannot use the MPEG2 indexing.

However, indexing with the digital recorder of the present invention is the same for all combinations of encoder/decoder techniques and stream protocols that the digital recorder captures to files.

The indexing method disclosed herein can be applied to any stream of packets, regardless of format.

When starting the recording process, the user can choose an upper bound for the number of indices to be maintained and the initial gap (for example, in bytes, packets or units of time) between consecutive indices. Then, as the recording process continues, the algorithm will generate indices on the fly, and the number of indices will always be between half of the upper bound and the upper bound, and the gap will be adjusted appropriately. That is, as the total amount of data grows larger while the number of consecutive indices must increase.

In computer systems, the ability to have an upper and lower bound of indices to describe a target is very important, due to the fact that for a given computer the memory is limited.

Given the above condition, it is desirable to keep the number of indices to some predefined upper bound. On the other hand, if the lower bound is too small, the indices will have no usefulness. The method disclosed below guarantees that the lower bound is half of the upper bound, and the generating and management of the indices is very efficient. In fact, the method disclosed below and shown by the flowchart in FIG. 7 allows the set of indices to be continually updated while changing at most one table entry per new index. Thus the table of indices can be efficiently updated on the fly while the live stream of data is being processed.

The details of the indexing method are as follows:

The streams are recorded to a file with the following format:

Header: header_base up to header_base+header_length
Index: index_base up to index_base+index_length
Data: data_base up to data_base+data_length The Index Section has the following format:

data_length (total size of the Data section)
upperbound_of_index_num (for example 256)
actual_index_num (actual number of indices)
index_gap (approximate gap between indices in bytes) [the above parameters are used to reinitialize the index array if recording is restarted.]
f[0]=0
f[1]
...
f[i] (the index values)

The generic indexing algorithm is described as follows:

```
//Initialization
if (the record file is new)
{
    length = 256; // or any positive, even integer
    unit=16k; // or any positive integer
    position=0;
    step=unit;
    target=unit;
    index[0]=0;
}
else
{
    Read indexing information from the file.
    length=upperbound_of_index_num;
    unit=index_gap;
    position=data_size;
    step=unit;
    target=actual_index_num * unit;
    for (i=0; i<actual_index_num; i++)
        index[i] = f[i];
}
// During the processing of the stream
while (packet())
{
    while (position >=target)
    {
        i=(target/unit)%(length-1);
        if (i==0)
            i=length-1;
        index[i]=position;
        if (target==length*step)
            step *=2;
        target += step;
    }
    position += length of packet;
    lastpacketsize = length of packet;
}
// at the end of the stream
f[0]=index[1];
    r=(position - lastpacketsize)/step;
for (i=1; i<=r; i++)
{
```

```
        j=(i*step/unit)%(length−1);
        if (j==0)
            j=length−1;
        f[i]=index[i];
}
data_size=position;
upperbound_of_index_num=length;
actual_index_num=r+1;
index_gap=step;
Write indexing information to the file.
```

Figure 7:
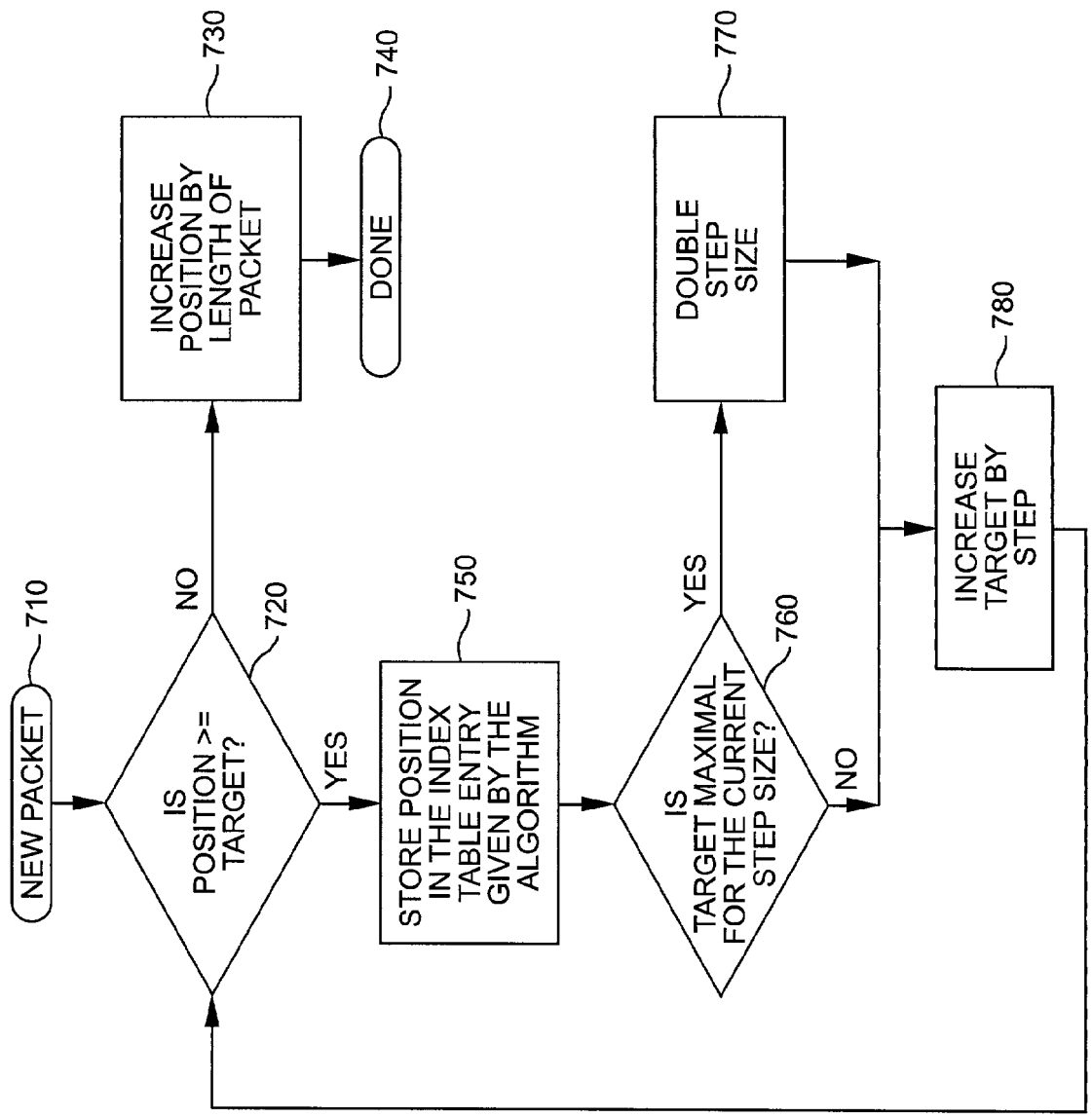
FIG. 7 is a flowchart of the indexing method of the present invention.

FIG. 7 is a flowchart showing how the index table is generated as a packet stream is received. As a new packet of the packet stream arrives (step 710), it is first determined whether the current position value is greater than or equal to a target value (step 720). If not, the position value is increased by the length of the packet (step 730), the index table does not change, and the index table generation process is done for that packet (step 740). If so, the current position value is stored in the index table, as per the above algorithm (step 750). Next, in step 760, it is determined whether the target value is a maximal target value for the current gap value (step size). If not, the target value is increased by the current gap value (step 780). If so, the current gap value (step size) is first doubled (step 770), and then the target value is increased by the new (doubled) gap value (step 780). After step 780 is completed, the process returns to step 720.

Thus, the indexing method of the present invention provides the following advantages:

it is iterative;

it is not necessary to know the length of the incoming stream in advance, which is generally unknown;

the indices are generated as packets are received;

at any given time, if the receipt of packets stops, there is a set of indices present at that time, which allows the packet stream to be played back with those indices;

only one index is being changed at a time;

the generating of the indices is prospective, i.e., there is no need to go back and examine previously received packets, which is especially important when receiving long packet streams; and it is protocol independent.

Of course, it will be appreciated by those skilled in the art that the invention may take forms other than those specifically described, and the scope of the invention is to be determined solely by the following claims.

We claim:

1. A system comprising a client computer and a host computer, said client computer comprising:

means for receiving a packet stream transmitted by said host computer over a first communication channel;

means for digitally recording the received packet stream to a file; and means for reconstructing the digitally-recorded file by retrieving one or more packets lost during transmission from said host computer, said reconstruction means using a second communication channel different from the first communication channel;

and said host computer comprising means for storing the transmitted packet stream into a file, from which file said reconstructing means of said client computer retrieves the one or more lost packets.

2. A system comprising a client computer and a host computer, said client computer comprising:

means for receiving a packet stream transmitted over a one-way communication channel by said host computer, the transmitted packet stream generated by said host computer by on-the-fly packet-level FEC encoding a plurality of original packets;

means for on-the-fly packet-level FEC decoding the received packet stream to obtain the plurality of original packets;

means for digitally recording the plurality of original packets to a file; and means, communicatively connected to said host computer, for reconstructing the plurality of original packets by retrieving one or more packets lost during transmission over the one-way communication channel, in the event the original packets cannot be obtained by said on-the-fly packet-level FEC decoding means; and said host computer comprising means for storing the transmitted packet stream into a file, from which file said reconstructing means of said client computer retrieves the one or more lost packets.

3. A method for iteratively generating a plurality of file indices as a packet stream is digitally recorded into a file, said method comprising the steps of:

at start of recording, selecting an upper bound for the total number of indices, and a gap between consecutive indices; and for each iteration, generating one of the file indices, wherein the total number of indices remains between half of the selected upper bound and the selected upper bound, and the gap between consecutive indices increases.

4. A method for generating an index table containing a plurality of file indices as a packet stream is digitally recorded into a file, said method comprising the steps of:

for each packet of the packet stream, determining whether a position value is greater than or equal to a target value;

if not, increasing the position value by the length of the packet, and if so, storing the position value in the index table;

determining whether the target value is a maximal target value for a current gap value, and if so, doubling the current gap value; and increasing the target value by the current gap value.

* * * * *